Aug. 6, 1935.  S. Z. DE FERRANTI  2,010,179
SPINNING, DOUBLING AND TWISTING MACHINERY
Filed Feb. 8, 1934   9 Sheets-Sheet 1

INVENTOR:
S. Z. de Ferranti
(deceased) by
G. R. Z. de Ferranti
Administratrix

By: Marks † Clerk
Attys.

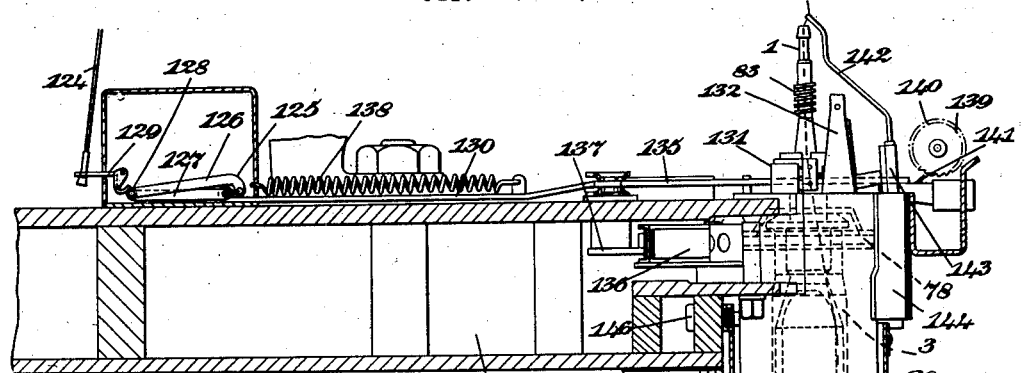
Aug. 6, 1935. S. Z. DE FERRANTI 2,010,179
SPINNING, DOUBLING AND TWISTING MACHINERY
Filed Feb. 8, 1934   9 Sheets-Sheet 3

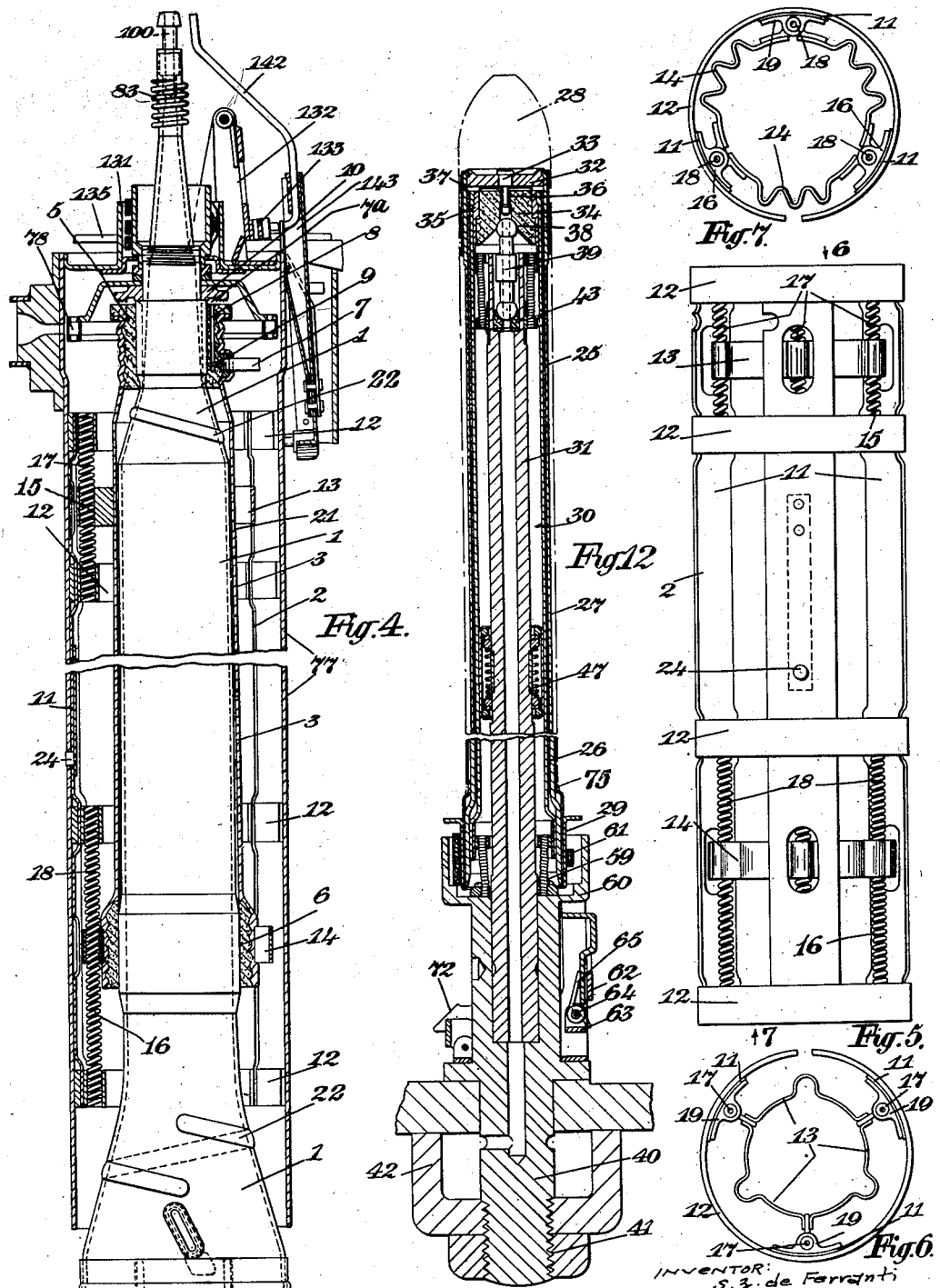

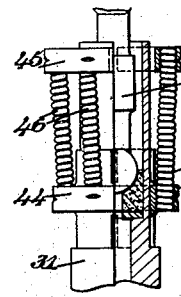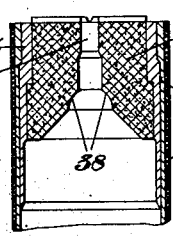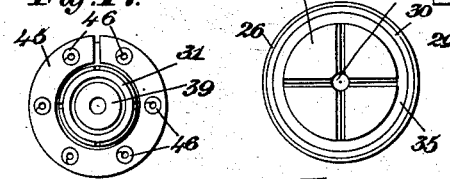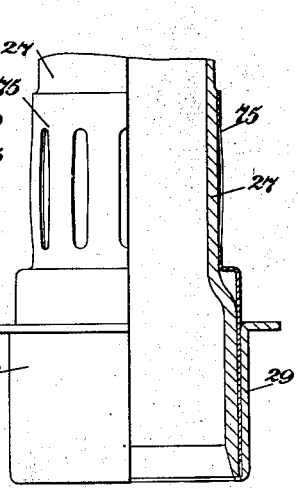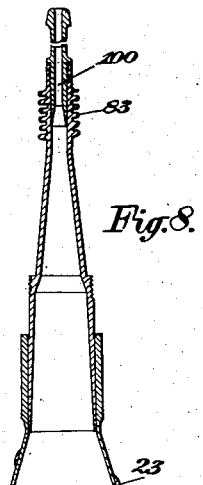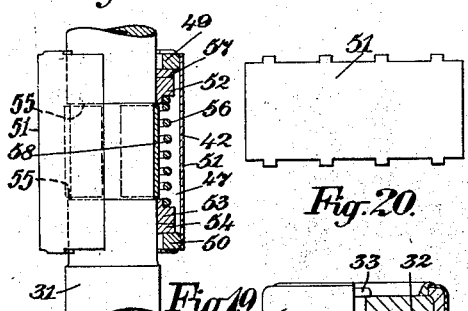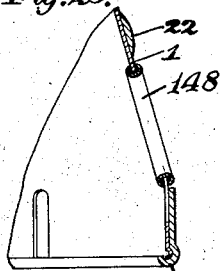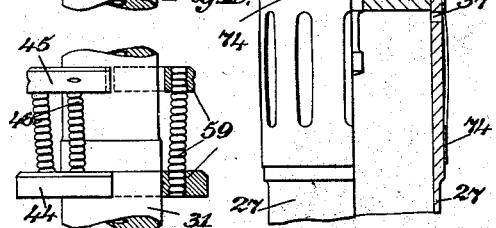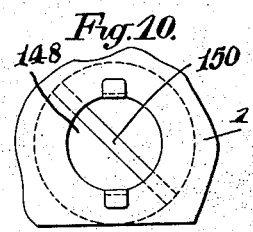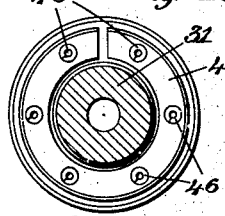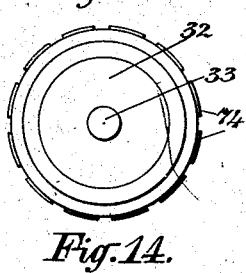

Aug. 6, 1935.   S. Z. DE FERRANTI   2,010,179
SPINNING, DOUBLING AND TWISTING MACHINERY
Filed Feb. 8, 1934   9 Sheets-Sheet 6
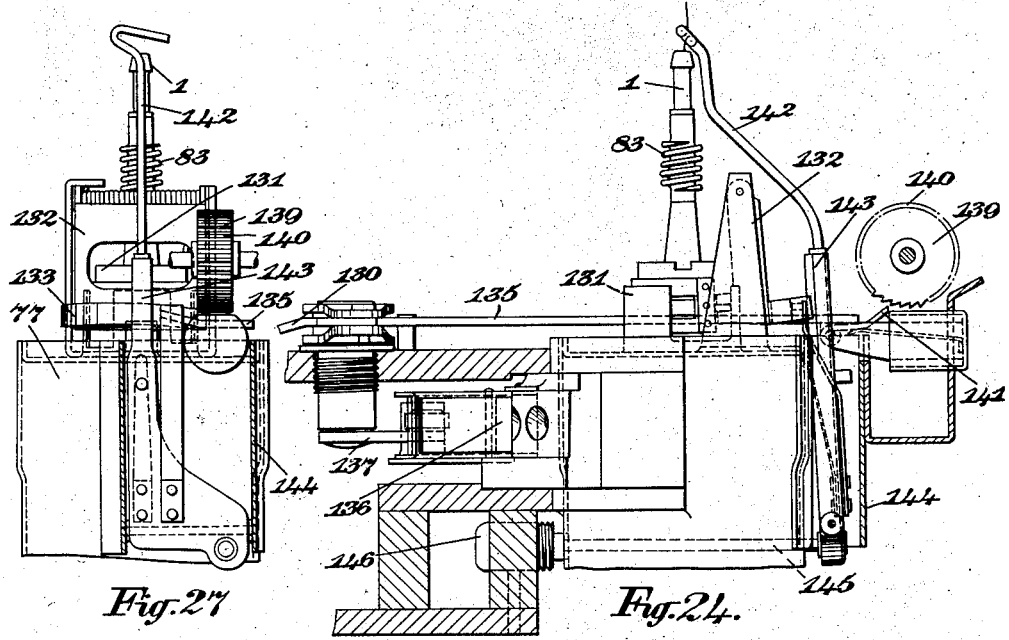
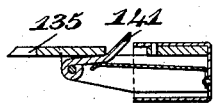
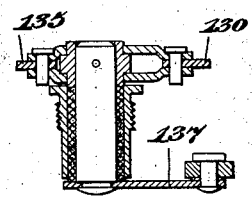
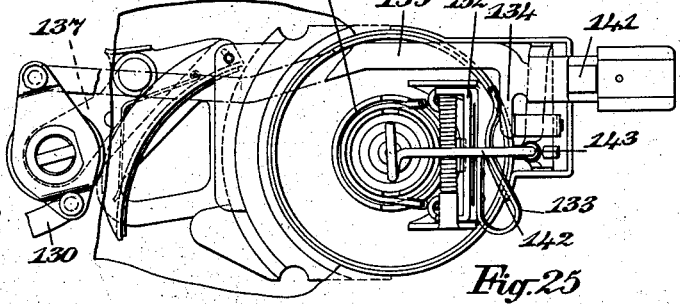
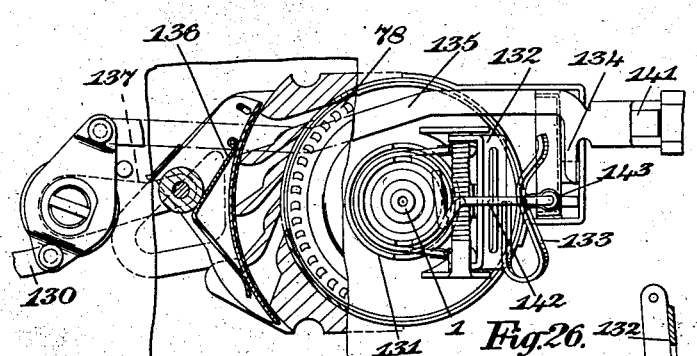

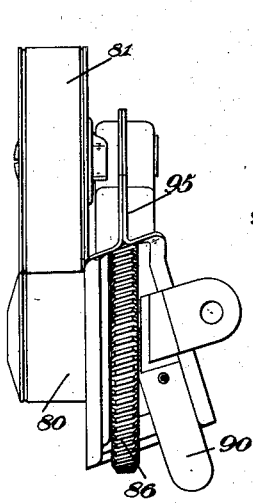
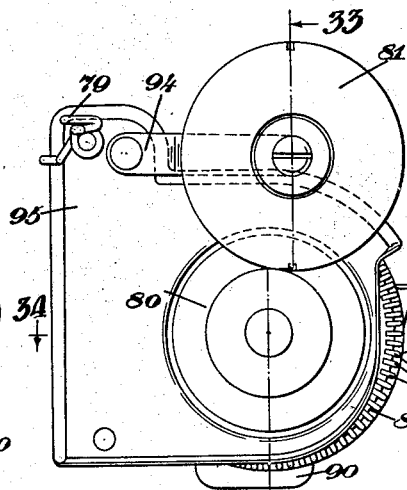

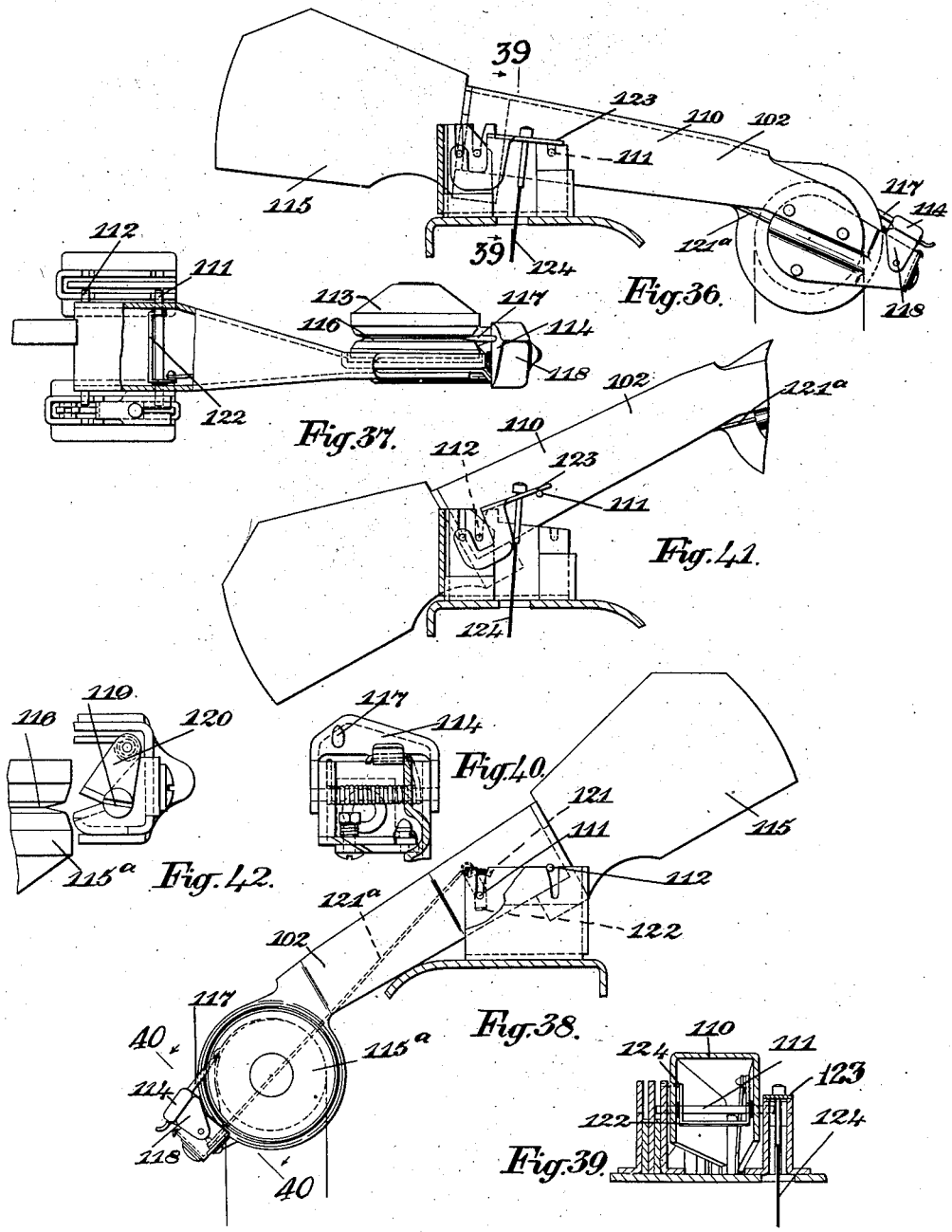

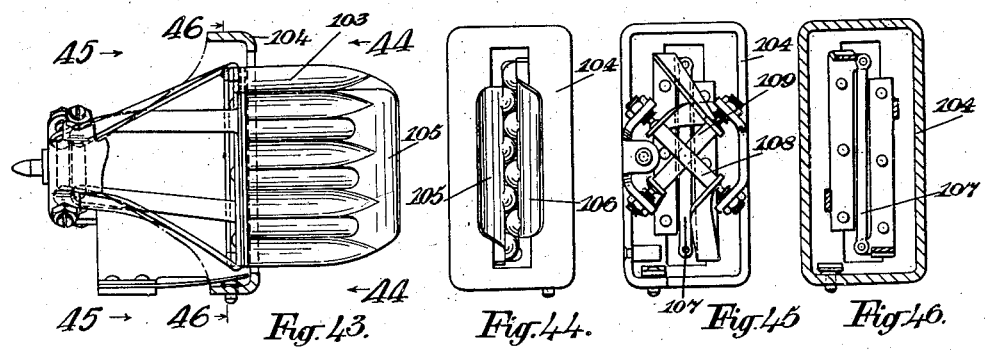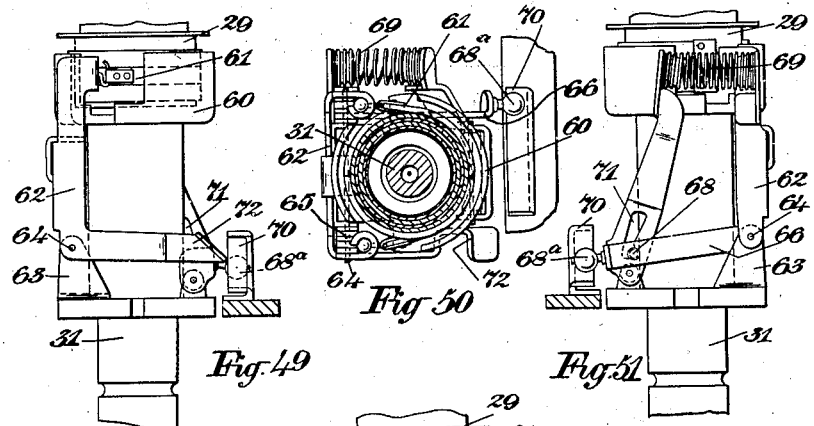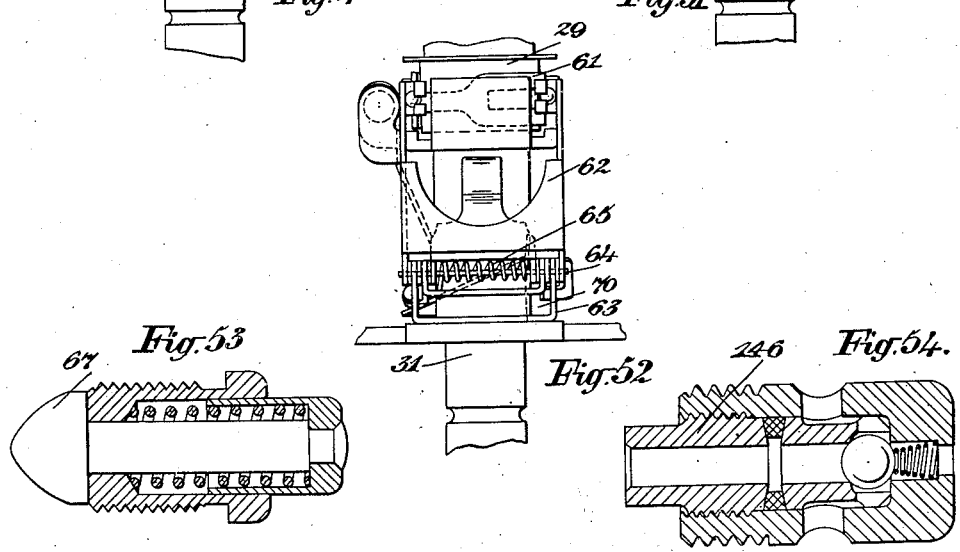

Patented Aug. 6, 1935

2,010,179

UNITED STATES PATENT OFFICE 2,010,179

SPINNING, DOUBLING, AND TWISTING MACHINERY

Sebastian Ziani de Ferranti, deceased, late of Hollinwood, England, by Gertrude Ruth Ziani de Ferranti, executrix, Upper Basildon, Pangbourne, England, assignor to Ferranti Inc., New York, N. Y.

Application February 8, 1934, Serial No. 710,366
In Great Britain February 13, 1933

9 Claims. (Cl. 118—50)

This invention relates to spinning, doubling and twisting machinery, especially to machines of the high speed flyer type. Investigation of a comparatively large number of spindles of this type showed that much had still to be done to ensure the desired success both from the aspect of speeds and also from that of product, and especially from the aspect of obtaining the desired product at the desired speed.

Many Letters Patent were subsequently obtained by the late Dr. S. Z. de Ferranti dealing with improvements made from time to time, and the object of the present invention is to provide still further improvements.

The late Dr. Ferranti found that with the above objects in view, the flyer should be balanced to a very high degree of accuracy, special attention should be paid to spindle construction and bearings, and also to flyer constructions and feed of yarn. The present application deals among other matters with the balancing of flyers to a high degree of accuracy, and includes also the combination in high speed spinning and like machinery of such flyers with suitable spindle constructions and bearings and flyer constructions and feeds, for the provision of spinning and like machines, improved to a very high degree.

Dealing with the question of flyer balancing, the late Dr. Ferranti found that the flyers should be balanced to such a high degree of accuracy as had not previously been realized to enable even the high speeds which had already been proposed to be maintained with economy from the point of view of breakage of the yarn, and further, that special attention should be paid to the bearings for the flyers.

The present invention consists in a process and apparatus for spinning, doubling and twisting on machines with resilient bearings and airborne spindles, in which the flyer is balanced to a high degree of accuracy, and in which the bearings for the flyer consist of a form of resilient or spring supported bearing, in which the bearing comprises two parts, namely, an outer cage and an inner tube. The flyer is air-borne along the axis of the inner tube and within it, and this inner tube is spring-supported inside the cage; the inner tube preferably comprises an electro-deposited copper shroud containing two carbon bearing surfaces.

The invention also consists in spinning, doubling and twisting machinery, according to the preceding paragraph, including in combination spindle constructions and bearings substantially as will hereinafter be described.

The invention also consists in spinning, doubling and twisting machinery, as indicated in either of the preceding two paragraphs, including in combination flyer constructions and feeds substantially as will hereinafter be described.

The invention also consists in high speed spinning, doubling and twisting machinery, with non-seizing bearings of carbon or the like, either in divided form or in continuous form.

The invention also consists in high speed spinning, doubling and twisting machinery, in which the spindle assembly consists of three parts or components, namely: an outer running tube for carrying the bobbin, and having a brake drum at the base; an intermediate bearing tube, stationary, but free to vibrate, having the same degrees of freedom as the running tube, except that of rotation about its axis, and having bearing surfaces on which the running tube rotates, and provided with a thrust device forming a thrust, or carrying bearing for the running tube at the top, this intermediate tube being spring supported on a fixed inner dead spindle, which, incidentally, is also provided with a braking assembly and a spring damping device.

The invention also consists in a method of forming flyers for high speed spinning, doubling and twisting machinery, namely, by electrodeposition on suitably shaped mandrels, for instance, by the electrodeposition of copper on appropriate mandrels.

The invention also consists in high speed spinning, doubling and twisting machinery, in which the flyers are air-driven, the air pressure being from about 1 to 2 lbs. per square inch, an automatic cut-off of the supply of the air on breakage of the yarn being provided, and preferably arrangements being made so that should an individual flyer be stopped, the spindle is automatically stopped by permitting full braking action to take place.

The invention also consists in high speed spinning, doubling and twisting machinery, in which the feed of yarn to the flyer takes place by way of two rolls set at an angle to the vertical, so chosen that the thread leaves the rolls in the same plane as that in which it enters the rolls, this plane also being the plane of the flyer worm.

The invention also consists in high speed spinning, doubling and twisting machinery with special thread severing arrangements substantially as described, which become automatically operative on snarling of the yarn, and stopping devices substantially as described becoming automatically operative on breakage of the thread.

The invention also consists in improvements in and relating to spinning, doubling and twisting machinery, substantially as herein described.

The accompanying drawings are provided to aid in the understanding of the invention and may shortly be described as follows:—

Figure 3 is a part sectional elevation of the spinning mechanism of Figure 1.

Figure 4 is a vertical section through the axis of a flyer bearing and driving mechanism with the flyer itself shown in position but not in section.

Figure 5 is a side elevation of the resilient mounting for the flyer bearing.

Figure 6 is a plan view of Figure 5 looking in the direction of the arrow A.

Figure 7 is an underside plan view of Figure 5 looking along arrow B.

Figure 8 is a sectional elevation of a flyer.

Figure 9 is a sectional view of the flyer eyelet.

Figure 10 is a view of a modified flyer eyelet.

Figure 11 is a sectional view of the modification shown in Figure 10.

Figure 12 is a section through the axis of the spindle and its associated mechanism with a bobbin tube shown in chain dotted lines.

Figure 13 is a detail of the top of the spindle running tube shown partly in section.

Figure 14 is a plan view of Figure 13.

Figure 15 is a detail view of the top of spindle bearing tube unit in section showing valve for running tube bearing.

Figure 16 is a plan of the part shown in Figure 15.

Figure 17 is a detail view of the anti-vibration device for the top of the spindle carbon bearing tube.

Figure 18 is a plan of the part shown in Figure 17.

Figure 19 is a detail view of a damping device for the centre of the spindle carbon bearing tube.

Figure 20 is a developed view of the casing of the damping device shown in Figure 19.

Figure 21 is a detail of the anti-vibration device for the bottom of the spindle carbon bearing tube.

Figure 22 is a plan of the part shown in Figure 21.

Figure 23 is an elevation in part section of the bottom of the spindle running tube.

Figure 24 is a side elevation in part section of the flyer brake and control lever mechanism.

Figure 25 is a plan view of the parts shown in Figure 24 when in working position.

Figure 26 is a similar view to that of Figure 25 but with the parts in stopped position.

Figure 27 is a front elevation of a flyer brake and control lever.

Figure 28 is a sectional view of the starting button.

Figure 29 is a sectional view through the turbine valve actuating spindle and lever.

Figure 30 is a deleveloped view of the flyer brake band.

Figure 31 is a side elevational view of a pair of feed rollers.

Figure 32 is a front elevation of the same parts as Figure 31.

Figure 33 is a sectional view through the feed rollers on line 33—33 of Figure 31.

Figure 34 is a section of lower feed roller and worm wheel on line 34—34 of Figure 31.

Figure 35 is a section of the oil feed box for the lower roller bearing.

Figure 36 is a side elevation of a balance lever in running position.

Figure 37 is a plan view of Figure 36.

Figure 38 is a reversed side elevation of balance lever in position caused by an obstruction in the yarn and showing cutter operating mechanism in dotted lines.

Figure 39 is a section on the line 39—39 of Figure 36.

Figure 40 is a section on the line 40—40 of Figure 38 to a larger scale.

Figure 41 is a side elevation of a balance lever in position taken up when yarn breaks.

Figure 42 is an underside view of the cutters shown to a larger scale than in Figure 38.

Figure 43 is a side elevation of a tensioning device.

Figure 44 is a front elevation of Figure 43 viewed in the direction of arrows D—D.

Figure 45 is a rear elevation of Figure 43 in the direction of arrows C—C.

Figure 46 is a section on line 46—46 of Figure 43.

Figure 47 is a detail of the toggle tripping mechanism with box in section, the toggle being shown in full lines in the collapsed position and in chain dotted lines in normal position for spinning.

Figure 48 is a plan view of Figure 47 partly in section.

Figure 49 is a side elevation of a spindle brake mechanism.

Figure 50 is a plan of Figure 49 partly in section.

Figure 51 is a reverse elevational view of Figure 49.

Figure 52 is a rear elevational view of Figure 49.

Figure 53 is a sectional view of a button for releasing the spindle brake.

Figure 54 is a section of a control valve controlling the hold-off mechanism for the flyer brake.

Figure 55 is a part sectional elevation of a bobbin tube with yarn wound on it.

Figure 1:
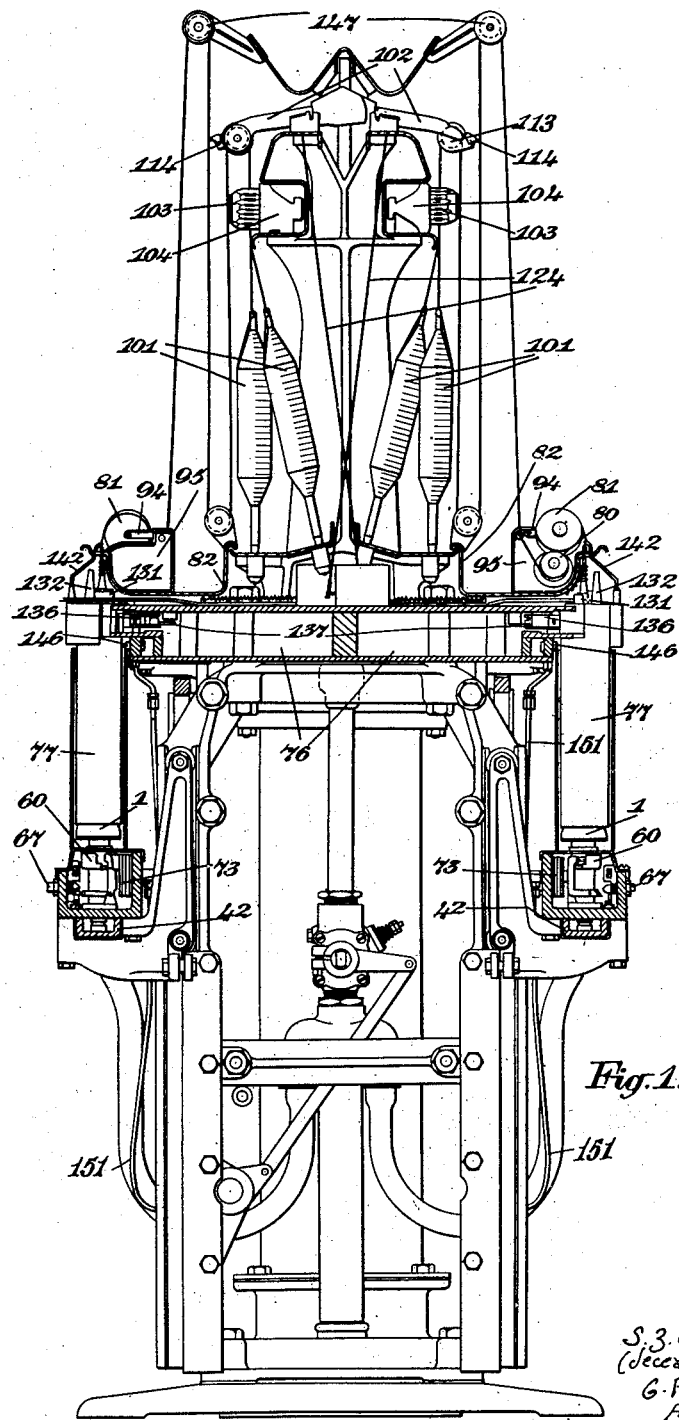
Figure 1 is a diagrammatic elevation of a spinning machine according to the invention.

In carrying the invention into effect in one form by way of example applied to Ziani de Ferranti type machines, for instance, those operated on the principles of British Letters Patent Nos. 18047/03, 18260/04 or 24941/06, the flyer is balanced to a high degree of accuracy. To effect this according to one form, the flyer is made by electrodeposition of copper, and is preferably chromium-plated. The bearing surfaces of the flyer should be ground.

Balancing according to one form is effected by the method described in the specification of British Patent No. 399845, the balancing process being carried out by removing parts of the spirals 22 and 23 with all the rotating parts of the flyer assembly in place. Referring to Figure 4, the bearings for the flyer 1 consist of a form of resilient or spring-supported bearing comprising two parts, namely, an outer cage 2 and an inner tube 3. The flyer 1 is air-borne along the axis of the inner tube 3 and within it, and this inner tube is spring-supported inside the cage 2. The inner tube consists of an electrodeposited copper shroud containing two carbon bearing surfaces 5 and 6 coacting with corresponding bearing surfaces on the flyer. Near the top of this inner tube air from any convenient source enters an inlet 7 which communicates with a channel formed by two drillings 8 and 9 at right angles, which leads the air to a space 7a beneath an air thrust washer 10 for keeping the rotating flyer assembly 1 from contact with the top of the flyer bearing tube 3 against the action of gravity. The bearing surfaces 5 and 6 within the tube are short in length and widely separated. The bearings are of moderate area, but need not be self-aligning; being divided they can distort through a comparatively great angle without upsetting conditions for the high speeds which come into question, especially where large bearing areas are to be avoided. To ensure against the air film breaking down with consequent seizure, either of the following two methods may be utilized, namely:—

(1) The use of non-seizing material for one of the bearing elements;

(2) The use of some other method such as the employment of high air pressure.

The factors governing success with air bearings appear to be the proper co-relation of load, density of air currents, area of bearing and condition or truth of surface. The outer cage 2 in which the flyer bearing tube 3, that is the inner tube, is suspended, consists of longitudinal strips of steel 11 with circumferential rings 12 welded to the strips.

The flyer bearing tube 3 is held by two corrugated rings 13 and 14 in which it is a push fit with some means of preventing it rotating. These corrugated rings 13 and 14 are separated by springs in line. There are two spring assemblies, 15 and 16, one at each end of the cage 2, and each consisting of three helical springs marked 17 and three marked 18, the mid points of the springs being attached to the flyer bearing tube supporting rings 13 and their ends to the rings 12 by means of the brackets 19. The bearing and bearing cage referred to above provide a self-centring bearing for, and supports the flyer; the corrugated rings 13 of the cage being adapted to engage grooves 21 formed on the outside of the flyer bearing tube 3.

The position of the cage is located by a spring pressed pin 24 which enters a hole in the surrounding casing.

The spindle constructions and bearings and flyer constructions and feed of yarn are preferably such as are hereinafter described.

When applied by way of example to Ziani de Ferranti type machines, for instance, those operating on the principles of British Letters Patent Nos 18047/1903, 18260/1904 or 24941/1906, special bearings 25 and 26 for the outer running tube of the spindle assembly made of carbon or the like are used to prevent seizing and may be in two axially separate parts as shown in Figure 12 or may be a single long bearing.

The spindle assembly in one example shown in Figure 12 consists of three parts or components, namely: an outer running tube 27 for carrying the bobbin 28, and having a brake drum 29 at the base; an intermediate bearing tube 30, stationary but free to vibrate, having the same degrees of freedom as the running tube 27, except that of rotation about its axis, and having bearing surfaces 25 and 26 on which the running tube 27 rotates. It is also provided with a thrust device, described below, forming a thrust, or carrying bearing for the running tube at the top. This intermediate tube 30 is spring-supported on a fixed inner dead spindle 31, which incidentally is also provided with a braking assembly and a spring damping device as described below.

The outer running tube 27 is formed of electro-deposited copper, a brass braking drum 29 being secured to the base. The top of the tube 27 is closed by a cap 32 carrying a small valve spindle 33, the bottom part of which enters a valve seating in the top of the intermediate tube.

The valve consists of a steel pin, the lower part of which is of greater diameter than the remainder.

The intermediate tube is formed of electro-deposited copper, and carries the bearing surfaces of carbon for the outer tube.

The intermediate tube 30 is closed at the top by a grooved graphite plug 34, held in place by a steel ring 35. It is bored centrally with a small hole 36 forming the seating for the valve pin 33 at the top of the outer running tube. The function of this valve is to enable air to pass by lifting the outer running tube to a certain extent, this lifting acting to cut off the air supply except for the leakage of air permitted by a small hole 37 in the outer running tube near the top. The lower face of the graphite plug 34 is formed with a hemispherical seating 38 to take a brass swivelling air connecting piece 39, mounted in the top of the inner spindle 31.

The inner spindle 31 consists of a steel tube closed at the base by a plug 40 externally threaded at 41 for mounting the tube in the rail 42. Alternatively, the spindle may be turned from the solid and internally drilled.

At the top of the spindle a resilient cage 43 see Figure 17 for supporting the intermediate tube is mounted. The resilient cage consists of a lower brass ring 44 fixed to the spindle and an upper ring 45 with a substantial clearance about the spindle, the two rings being joined by a series of helical springs 46. Within the tube, in the vicinity of this cage, there is provided a brass tubular connecting piece 39 with spherical ends, one bearing in the spindle and the other bearing the intermediate tube. Air passes through this connecting piece from the inside of the spindle to the inside of the intermediate tube. The dead spindle also carries a spring rod friction damper 47 for connecting with approximately the mid-point of the intermediate tube. The position, however, does not appear to be material.

This damping device, see Figures 19 and 20, consists of an outer cage 48 comprising top and bottom washers 49 and 50 respectively, having a substantial clearance with respect to the spindle 31, and loosely carrying a spring clip or in incomplete ring 51. Two further brass washers 52 and 53 are associated with the spindle; one, 52, is located roughly in position between two shoulders 55 formed on the spindle by the edges of a split collar 58, fibre or other damping washers 54 and 57 rest on the spindle between the brass washer 50 and the lower washer 53, and the brass washer 49 and the upper washer 52 respectively. The top brass washer 53 of this part is also loose on the spindle, but has very little clearance. This point of clearance also applies to the bottom brass washer 52.

Between these two washers a light helical spring 56 is disposed. The clearances of these washers are less than the clearances of the washers of the outer assembly.

The resilient washers 54 and 57 act as friction washers, and are provided for that purpose.

The assembly apparently acts to prevent excessive amplitude of vibration which might be caused by out-of-balance due to differences in winding of the cotton on the bobbin resulting from, for example, periodical uneven drag.

At the bottom of this fixed spindle a spring mounting 59 similar to that at the top is provided, but it is of larger diameter. It is contained within a cage 60 see Figures 49 to 52 fixed to the spindle over the brake drum 29, and in the space between the two the brake band 61 is placed. This brake band, which is similar to the one shown in Figure 30, is carried by a clip 62 pivoted on a support 63, the pivot pin 64 which holds the clip having a helical spring 65 mounted on it, which normally keeps the brake band 61 in contact with the brake drum 29. A lever 66 is provided for varying the strength of the helical spring 65 and a thumb pressed piece 67, see Figure 53, for relieving the brake carrier or clip 62 from the action of the spring 65.

The aforesaid lever 66 has a pin 68 which works in a subsidiary brake control. The subsidiary control is connected with the main control by means of a very light helical spring 69. The lever 66 referred to above is automatically moved up throughout the filling of the bobbin by the ramp 70 raising the ball end 68a of the arm or lever 66 (see Figures 49 to 52). The slot 71 in which the pin of this lever works is so shaped that as the lever moves up, the compression effect of the light helical spring 69 first increases and then decreases. This is required because first winding occurs on a small diameter so that the torque is small and tension is correspondingly large, so that the braking effect must not be so strong. As winding proceeds and the diameter of winding increases, the torque is increased so that the braking effect must be increased, because the tension in the yarn must not be permitted to rise above a certain amount as the bobbin is being driven through the tension in the yarn. Any decrease of tension below a certain minimum amount would cause snarling of the thread. The brake is provided with a thumb button release in which an inclined part of a bell crank continuation 72 of the U shaped brake band fixing 62 is adapted to be depressed by the curved end of the push button 67.

The brake band U-shaped carrier clip is relieved of the tension of the main spring 65 by means of an aneroid device 73 see Figure 3 consisting of a number of brass cells. The action takes place on the admission of air into this device throughout the filling of the bobbin, the air supply being cut off on the stopping of the frame and bringing the heavy braking action into effect. Similar conditions occur on the stoppage of any individual unit for any cause.

The spindle assembly carries the bobbin 28 which consists of an electrodeposited copper tube, the means for driving the bobbin comprising two slotted steel rings 74 and 75 mounted respectively at top and bottom of the driving tube 27, the bobbin being a push-fit on these rings.

When applied by way of example to Ziani de Ferranti type machines, for instance, those operating on the principles of British Letters Patent Nos. 18047/03, 18260/04 or 24941/06, the method employed for the manufacture of the high speed flyers consists in electrodeposition upon suitably shaped mandrels. The preferred metal is copper, but alternatively, iron may be used. Other metals or alloys may also be chosen.

The flyer drive to a certain extent follows British specifications Nos. 18260/04 and 16716/05.

The air pressure used is from 1 to 2 lbs. per square inch. The speed is of the order of 20,000 revolutions per minute.

There is an automatic cut-off of the supply of air on breakage of the yarn. Referring to Figures 1 and 3 the air flow is from the air chest 76 by way of a direct connection through the valve 136 to the turbine 78 (Fig. 3), and afterwards, by exhaust to atmosphere. There is a flexible connection 150 between an aneroid device 73 for releasing the spindle brake and the flyer drive air on the turbine side of the flyer shut-off valve; the result of this is that should an individual flyer be stopped, the spindle is automatically stopped by allowing the spring 65 to act on the brake, and permitting full braking to take place.

Figure 2:
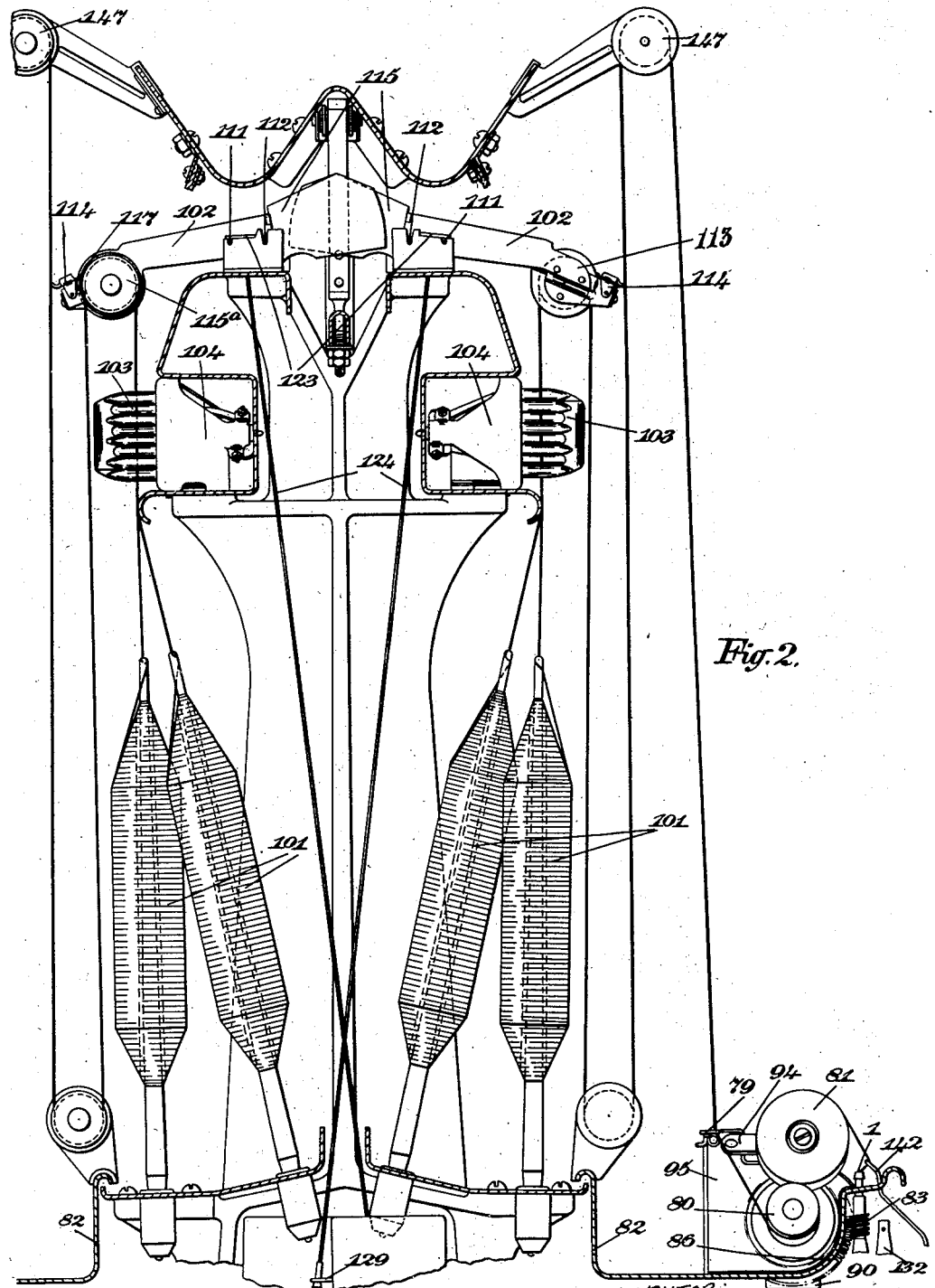
Figure 2 is a part sectional elevation of the yarn delivering and tensioning part of Figure 1.

As regards the feed of yarn to the flyer, the feed takes place through an eye 79, under a lower roll 80, between the lower and an upper roll 81, over the upper roll and down through the top of the flyer 1. The lower roll 81 is partly immersed in a trough of water 82 for wet spinning. These details are clearly shown in Figure 2.

The axes of the two rolls 80 and 81 are not horizontal but are set at an angle thereto, this angle being so chosen that thread entering the eye 79 and the thread leaving the rolls are in one plane which plane also contains the axis of the flyer worm 83. To effect this conveniently the lower roll 80 consists of a hollow shell 84 with an internal tubular hub 85 which screws into the worm wheel 86 driven by the corresponding flyer worm. The worm wheel is formed with teeth 87 of a self-lubricating material, such as lignum vitæ, set at an angle to the axis to allow for the departure of the axis of the roll 80 and worm wheel 86 from the horizontal.

This assembly of lower roll 80 and worm wheel 86 is carried on an axially drilled conical pin 87 having a groove 88, the pin being mounted in a block 89 recessed to form an annulus 91 in communication with a supply of oil in a trough 90 from which the oil enters the annulus by capillary action. As the lower roll rotates, the oil is drawn along the groove 88 and exhausts back to the trough through the clearance between the spindle and the tube of the lower roll. This ensures continual automatic lubrication. The assembly of lower roll and gear wheel is, in fact, supported, in the sense that the roll is provided with a conical shield 92 for preventing water interfering with the lubrication. This cone forms part of a plate 93 in an angular two-part casting 95 disposed at an angle to the vertical for the reasons explained above.

The upper roll 81 is mounted on the end of an arm 94 loosely pivoted in the same casing. It consists of an outer casing 96 with an inner shell 97, the former carrying a carbon bush 98 and the latter a steel pin 99 forming the bearing. The weight of the top roll is more than sufficient to overcome the tendency of the yarn to slide between the rolls due to its drag, but is not sufficiently great to cause damage to the yarn owing to this drag, or to flatten the yarn.

The described angular setting of the feed rolls and worm gear enables the yarn to be directly in line with the mouth 100 of the flyer, giving the minimum amount of gearing between the flyer and the feed roll, whilst maintaining the correct and individual twist.

The gear acts as a kind of balance between, or synchronizer of, the feed roll drive and the flyer drive.

The feed rolls are driven both by the yarn, due to the pull on the bobbin, and by the flyer, due to the gearing at the top.

There is also provided a special thread severing arrangement automatically operative on snarling of the yarn and a stopping device automatically operative on breakage of the thread.

The snarling referred to here is not a matter of snarling below the feed rolls 80 and 81. The term "snarling" includes, however, any holding up of the yarn between the cop 101 and the balance arm 102 referred to below. In the first place the balance arm is raised to such a height above the feed rolls, or the length of thread between the severing device of the balance arm and the feed rolls is made so great that should a thread be severed a single length will not fall from the top into the rotating parts, and so cause an entanglement before the flyer has been brought to rest.

For doubling, the cops are arranged in pairs, doubling being effected from the cops directly. The thread from each cop is passed through a tension device 103. This consists of a framework of metal plate 104, see Figures 43 to 46, carrying two co-operative plates of gridiron character 105 and 106 with rounded beads, the bead of one entering the slot of the other. These two plates are connected by a light cross arm 107, diagonally arranged to form a kind of link motion, the cross arm being slightly offset from the plates. The plates have a cross mounting, that is to say, the top of the left plate is pivoted on the right hand side of the framing at the top, and the bottom of the left plate is pivoted on the left hand side of the casing at the bottom. The top of the right plate is pivoted on the left side of the casing at the top, and the bottom of the right plate is mounted on the right of the casing at the bottom. The mountings are made on cross centres 108, 109 disposed at 45° to the vertical, so that in this way the plates tend to fall by their own mass, the result being that the frictional control is independent of any spring variation, or of the speed of the yarn passing through the tension device or of other characteristics of the yarn.

From this tensioning device the yarn passes to the balance arm 102 referred to above see Figures 36 and 37. This balance arm consists of an aluminium or like framework 110, having two points of suspension 111 and 112. It is provided at one end with a pivoted roll 113 fitted with the clearer assembly 114 described below, and a counterbalance 115 at the other, so that of itself it normally tends to sit with the roll 113 elevated. When the frame is running the balance arm 102 rests on both pivots, being kept in this position owing to the friction on the yarn introduced by the tensioning device 103. This friction is insufficient to cause the balance arm to pivot only on the pivot 111 nearer the roll. Should the pull on the yarn become too great, owing to some defect in the yarn acting on the clearer on the roll, referred to below, or owing to a hold-up on the cop 101, the balance arm 102 pivots on the forward pivot 111 only.

The clearer assembly 114 consists of a grooved pulley 113 having a U shaped groove 116 with which a pin 117 co-operates. The pin is made of such a size, and the grooves of such a depth, that it will not pass faulty yarn, which latter would become impaled on the spike and cause the balance arm 102 to tip on to the forward pivot 111.

The pin referred to above is mounted in a spring controlled frame 118. The balance arm is provided with a thread severing device 119 disposed in the vicinity of the grooved pulley and consisting of a scissors device, the movable part 120 of which is operated by a wire 121a connected with a light pivoted frame 122, one end of which projects through a slot 121 in the framework 110, in the vicinity of the forward pivot 111. The shape of this slot and the position of the projecting part is such that when the arm 102 pivots about the rear pivot 112, the projection from the scissors operating frame 122 is quite clear of the side of the slot 121 in which the scissors projection rides, but when the arm 102 is caused to pivot about the forward pivot 111, the side of the slot 121 catches the projection, causing it to ride backwards in its own slot 121 and sever the yarn.

On the yarn breaking or being severed, the arm 102 becomes free, and assumes the position corresponding to the position of equilibrium, which may be vertical or substantially so as controlled by the general framework of the machine. The result of this is, that the forward pivot 111 lifts a small plate 123 which raises a wire 124 extending downwards to a trip gear which controls the air valve on the flyer. As shown in Fig. 47 the trip gear includes a toggle 125 with two arms 126 and 127 of unequal length, the apex 128 of the toggle being normally held in position by a roller on the toggle apex and light tongue or bell crank lever 129 pivoted in the framework. The light pull on the tongue 129 breaks the toggle and an arm 130 connected thereto on this occurring moves forward and cuts off the air supply. The result of this is that on the severing or breakage of one of the threads of the pair of cops feeding the spindle the unit is stopped due to the air supply being cut off from the flyer and the brake applied to the spindle. A brake is also applied to the flyer.

The flyer brake 131 shown in Figures 24–27 and 30 consists of a brake band shown in Figure 30 operating on the flyer 1, the ends of the brake band being connected to a spring-controlled framework 132, substantially similar to that of the spindle brake. This framework is also provided with a flat spring 133 which co-operates with a spring pressed finger 134 controlled by the starting lever 135. When the starting lever is pushed forward, the flat spring is pushed forward, the brake is removed, the air supply is admitted to the turbine by the opening of the valve 136 by the lever 137, and the trip gear is re-set by stressing the spring 138 and until the apex of the toggle drops below the tongue 129. On the trip gear operating, the starting rod 135 is released. This trip gear is mounted on the casing 77 surrounding the flyer 1. This case also carries a thread trip for holding sufficient yarn to take up on the fresh spindle after the doffing operation.

The trip action from the stopping action is provided with a delay device 139, which ensures that the spindle shall stop rotating before the flyer. This delay device consists of a grooved roll 140 in which the grooves are somewhat of ratchet formation, this roll co-operating with the top edge of a spring tongue 141 on the starting rod. This grooved roll continually rotates at a slow speed, so that the starting lever can only be moved back into the stopping position at a comparatively slow rate.

In connection with this mechanism generally there are two forms of valve for operating the spindle stopping brake which may be employed. One form consists of a wire 142, mounted on the end of a light lever 143 pivoted in a casing 144 near the top of the flyer, and having at the lower end a push rod 145 operating a ball valve 146 shown in detail in Figure 54 which admits air to the spindle bellows or aneroid 73. When the brake is applied the flyer stops, and so the drag on the yarn is reduced. The wire 142, which is behind the yarn and pulled back by the tension of the yarn, is now allowed to come forward, thus closing the ball valve 146 and cutting off the supply of air to the spindle bellows. This allows the spindle brake to stop the spindle as previously described. The alternative form is that referred to above, namely, that in which there is a connection between the bellows and the nozzle to the turbine which drives the flyer, so that when the air is cut off from the turbine the rotation of the spindle is stopped by the brake.

In all the above description it has been assumed that the spindle is a lagging spindle, that is to say, the flyer is driven and the rotation of the spindle is obtained by the pull of the yarn.

Another detail which may be noted is that the yarn in passing from the top balance arms 102 is doubled on overhead rolls 147, that is to say, the yarn from each pair of cops 101 passes over a single roll 147. From this overhead roll it is led to the feed rolls. The braking action on the whole of the spindles is simultaneously varied, as building up takes place by means of cam mechanism operating on a rod extending along the length of the frame and provided at each spindle with an inclined plane or ramp 70 on which rides the ball 68a mounted on the pivoted arm 66 carrying the pin 68 riding in the slot 71 of the auxiliary brake control.

The worm wheel 86 referred to above in connection with the feed rolls has teeth with parallel sides to permit a certain amount of vibration between the flyer worm 83 and the worm wheel 86 to take place if necessary.

The spindles may be closely spaced, for example, the centres may be 2 inches apart.

What is claimed is:—

1. Apparatus for spinning, doubling and twisting fibrous materials comprising spindles, flyers mechanically balanced by removal of material, and mounted in a form of resilient or spring supported bearing comprising two parts namely an outer cage and an inner tube, air bearings supporting the flyer in the inner tube and resilient means supporting the inner tube in the cage.

2. Apparatus for spinning, doubling and twisting fibrous materials comprising spindles, flyers mechanically balanced by removal of material, and mounted in a form of resilient or spring supported bearing comprising two parts namely an outer cage and an inner tube, air bearings supporting the flyer in the inner tube and resilient means supporting the inner tube in the cage, the said inner tube being furnished with two bearing surfaces.

3. Apparatus for spinning, doubling and twisting fibrous materials comprising spindles, flyers mechanically balanced by removal of material, and mounted in a form of resilient or spring supported bearing comprising two parts namely an outer cage and an inner tube, air bearings supporting the flyer in the inner tube and resilient means supporting the inner tube in the cage, the said inner tube being formed from electrodeposited copper.

4. Apparatus for spinning, doubling and twisting fibrous materials comprising spindles, flyers mechanically balanced by removal of material and mounted in a form of resilient or spring supported bearing comprising two parts namely an outer cage and an inner tube, air bearings supporting the flyer in the inner tube and resilient means supporting the inner tube in the cage, the said inner tube being formed from electrodeposited copper and furnished with two carbonaceous bearing surfaces.

5. Apparatus for spinning, doubling and twisting fibrous materials including a spindle assembly comprising an outer running tube for carrying a bobbin, a brake drum at the base of said outer running tube, an intermediate tube stationary but free to vibrate and having the same degrees of freedom as the running tube except that of rotation about its axis, circumferential bearing surfaces on said intermediate tube coacting with said running tube, a thrust bearing at the top of said intermediate tube for supporting said running tube, a fixed inner dead spindle, a braking assembly on said dead spindle coacting with said brake drum on said outer running tube, resilient supporting means and spring damping means on said dead spindle for supporting and damping respectively said intermediate tube.

6. Apparatus for spinning, doubling and twisting fibrous materials as claimed in claim 1 wherein the said flyers are formed by electro-deposition upon a mandrel.

7. Apparatus for spinning, doubling and twisting fibrous materials as claimed in claim 1 wherein the said flyers are formed by electro-deposition of copper upon a mandrel.

8. Apparatus as claimed in claim 5 wherein the damping device carried by the inner dead spindle is composed of three parts, viz. one near each end and one near the middle of the said spindle and between the spindle and the said intermediate tube.

9. Apparatus as claimed in claim 5 including means on the outer running tube for frictionally securing the bobbin to said running tube.

GERTRUDE RUTH ZIANI DE FERRANTI,
*Executrix of the Estate of Sebastian Ziani de Ferranti, Deceased.*